US011221432B2

(12) United States Patent
Baur et al.

(10) Patent No.: US 11,221,432 B2
(45) Date of Patent: Jan. 11, 2022

(54) UPDATING SYNTHETIC HORIZONS BASED ON CHANGES TO INTERPRETED HORIZONS IN A SUBSURFACE REPRESENTATION

(71) Applicant: Chevron U.S.A. Inc., San Ramon, CA (US)

(72) Inventors: Friedemann Ulrich Maximilian Baur, Houston, TX (US); Gregory Ian Ball, Houston, TX (US); Chao Zhao, Houston, TX (US); Barry Jay Katz, Houston, TX (US); Brian S. Cabote, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/929,985

(22) Filed: Jun. 1, 2020

(65) Prior Publication Data
US 2021/0373198 A1 Dec. 2, 2021

(51) Int. Cl.
*G01V 99/00* (2009.01)
*G01V 1/28* (2006.01)

(52) U.S. Cl.
CPC ............ *G01V 99/005* (2013.01); *G01V 1/282* (2013.01); *G01V 2210/66* (2013.01)

(58) Field of Classification Search
CPC ..... G01V 99/005; G01V 1/282; G01V 2210/66
See application file for complete search history.

(56) References Cited

U.S. PATENT DOCUMENTS 6,138,076 A * 10/2000 Graf .................. G06T 17/05
702/14
8,743,115 B1 * 6/2014 Mallet .................... G06T 3/20
345/424

OTHER PUBLICATIONS

PCT International Search Report and Written Opinion for PCT Application No. PCT/US2021/034589, dated Jun. 29, 2021 (9 pages).

* cited by examiner

*Primary Examiner* — Roy Y Yi
*Assistant Examiner* — Geoffrey T Evans
(74) *Attorney, Agent, or Firm* — Esplin & Associates, PC

(57) ABSTRACT

Changes to interpreted horizons in a subsurface representation are propagated to synthetic horizons in the subsurface representation by maintaining relative distances between the synthetic horizons and interpreted horizons. Distance ratios of synthetic horizons between interpreted horizons are applied to changed interpreted horizons to derive new locations of synthetic horizons.

18 Claims, 8 Drawing Sheets

UPDATING SYNTHETIC HORIZONS BASED ON CHANGES TO INTERPRETED HORIZONS IN A SUBSURFACE REPRESENTATION

FIELD

The present disclosure relates generally to the field of determining locations of horizons in subsurface representations.

BACKGROUND

A subsurface representation may include interpreted horizons and synthetic horizons. Synthetic horizons may be derived from interpreted horizons. Updating synthetic horizons based on changes to interpreted horizons in the subsurface representation may be difficult and/or time consuming, but may be necessary to build alternative model realizations.

SUMMARY

This disclosure relates to updating horizons in a subsurface representation. Subsurface representation information, horizon change information, and/or other information may be obtained. The subsurface representation information may define the subsurface representation. The subsurface representation may include interpreted horizons, synthetic horizons, and/or other horizons. At least one of the synthetic horizons may be located between two of the interpreted horizons such that a first synthetic horizon is located between a first interpreted horizon and a second interpreted horizon. Relative positions of individual synthetic horizons with respect to adjacent interpreted horizons may be determined such that relative positions of the first synthetic horizon are determined with respect to the first interpreted horizon and the second interpreted horizon.

The horizon change information may define change to at least one of the interpreted horizons, including the first interpreted horizon. The interpreted horizons of the subsurface representation may be updated based on the horizon change information and/or other information such that the interpreted horizons of the subsurface representation are updated to include change of the first interpreted horizon to a first changed interpreted horizon. The synthetic horizons of the subsurface representation may be updated based on the update to the interpreted horizons of the subsurface representation and/or other information. The synthetic horizons may be updated to preserve the relative positions of the individual synthetic horizons with respect to the adjacent interpreted horizons such that the synthetic horizons of the subsurface representation are updated to include change of the first synthetic horizon to a first changed synthetic horizon. The relative positions of the first synthetic horizon with respect to the first interpreted horizon and the second interpreted horizon may be preserved in relative positions of the first changed synthetic horizon with respect to the first changed interpreted horizon and the second interpreted horizon.

A system that updates horizons in a subsurface representation may include one or more electronic storage, one or more processors and/or other components. The electronic storage may store subsurface representation information, information relating to subsurface representation, information relating to interpreted horizons, information relating to synthetic horizons, information relating to relative positions of synthetic horizons with respect to adjacent interpreted horizons, horizon change information, information relating to change to interpreted horizons, information relating to update to interpreted horizons, information relating to update to synthetic horizons, and/or other information.

The processor(s) may be configured by machine-readable instructions. Executing the machine-readable instructions may cause the processor(s) to facilitate updating horizons in a subsurface representation. The machine-readable instructions may include one or more computer program components. The computer program components may include one or more of a subsurface representation component, a relative position component, a horizon change component, an interpreted horizon component, a synthetic horizon component, and/or other computer program components.

The subsurface representation component may be configured to obtain subsurface representation information and/or other information. The subsurface representation information may define a subsurface representation. The subsurface representation may include interpreted horizons, synthetic horizons, and/or other horizons. At least one of the synthetic horizons may be located between two of the interpreted horizons such that a first synthetic horizon is located between a first interpreted horizon and a second interpreted horizon.

In some implementations, the subsurface representation may include a two-dimensional subsurface representation. The interpreted horizons and the synthetic horizons may be defined as lines within the two-dimensional subsurface representation.

In some implementations, the subsurface representation may include a three-dimensional subsurface representation. The interpreted horizons and the synthetic horizons may be defined as surfaces within the three-dimensional subsurface representation.

The relative position component may be configured to determine relative positions of individual synthetic horizons with respect to adjacent interpreted horizons. The relative positions of individual synthetic horizons with respect to adjacent interpreted horizons may be determined such that relative positions of the first synthetic horizon are determined with respect to the first interpreted horizon and the second interpreted horizon.

In some implementations, the relative positions of the individual synthetic horizons with respect to the adjacent interpreted horizons may be determined at grid points across the individual synthetic horizons.

In some implementations, the relative positions of the individual synthetic horizons with respect to the adjacent interpreted horizons may be determined as distance ratios of the individual synthetic horizons between the adjacent interpreted horizons.

The horizon change component may be configured to obtain horizon change information and/or other information. The horizon change information may define change to at least one of the interpreted horizons. The interpreted horizon(s) to which the horizon change information defines change may include the first interpreted horizon and/or other interpreted horizons. Change to an interpreted horizon may include change to location, age, and/or other characteristics of the interpreted horizon.

In some implementations, the change of the first interpreted horizon to the first changed interpreted horizon may include the first interpreted horizon being shifted vertically and/or laterally within the subsurface representation to generate the first changed interpreted horizon.

In some implementations, the change of the first interpreted horizon to the first changed interpreted horizon may include a shape of the first interpreted horizon being changed to generate the first changed interpreted horizon.

In some implementations, the change of the first interpreted horizon to the first changed interpreted horizon may include a slope of the first interpreted horizon being changed to generate the first changed interpreted horizon.

The interpreted horizon component may be configured to update the interpreted horizons of the subsurface representation based on the horizon change information and/or other information. The interpreted horizons of the subsurface representation may be updated to include change of the first interpreted horizon to a first changed interpreted horizon, and/or other change to the interpreted horizons.

The synthetic horizon component may be configured to update the synthetic horizons of the subsurface representation based on the update to the interpreted horizons of the subsurface representation and/or other information. The synthetic horizons may be updated to preserve the relative positions of the individual synthetic horizons with respect to the adjacent interpreted horizons. The synthetic horizons of the subsurface representation may be updated to include change of the first synthetic horizon to a first changed synthetic horizon. The relative positions of the first synthetic horizon with respect to the first interpreted horizon and the second interpreted horizon may be preserved in relative positions of the first changed synthetic horizon with respect to the first changed interpreted horizon and the second interpreted horizon.

In some implementations, the first interpreted horizon may be located above the second interpreted horizon, and a third interpreted horizon may be located above the first interpreted horizon. Change of the first interpreted horizon to the first changed interpreted horizon may affect locations of synthetic horizons between the first changed interpreted horizon and the second interpreted horizon and locations of synthetic horizons between the first changed interpreted horizon and the third interpreted horizon.

In some implementations, the update to the synthetic horizons may include change to ages of the synthetic horizons.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to updating horizons in a subsurface representation. Changes to interpreted horizons in a subsurface representation are propagated to synthetic horizons in the subsurface representation by maintaining relative distances between the synthetic horizons and interpreted horizons. Distance ratios of synthetic horizons between interpreted horizons are applied to changed interpreted horizons to derive new locations of synthetic horizons.

Figure 1:
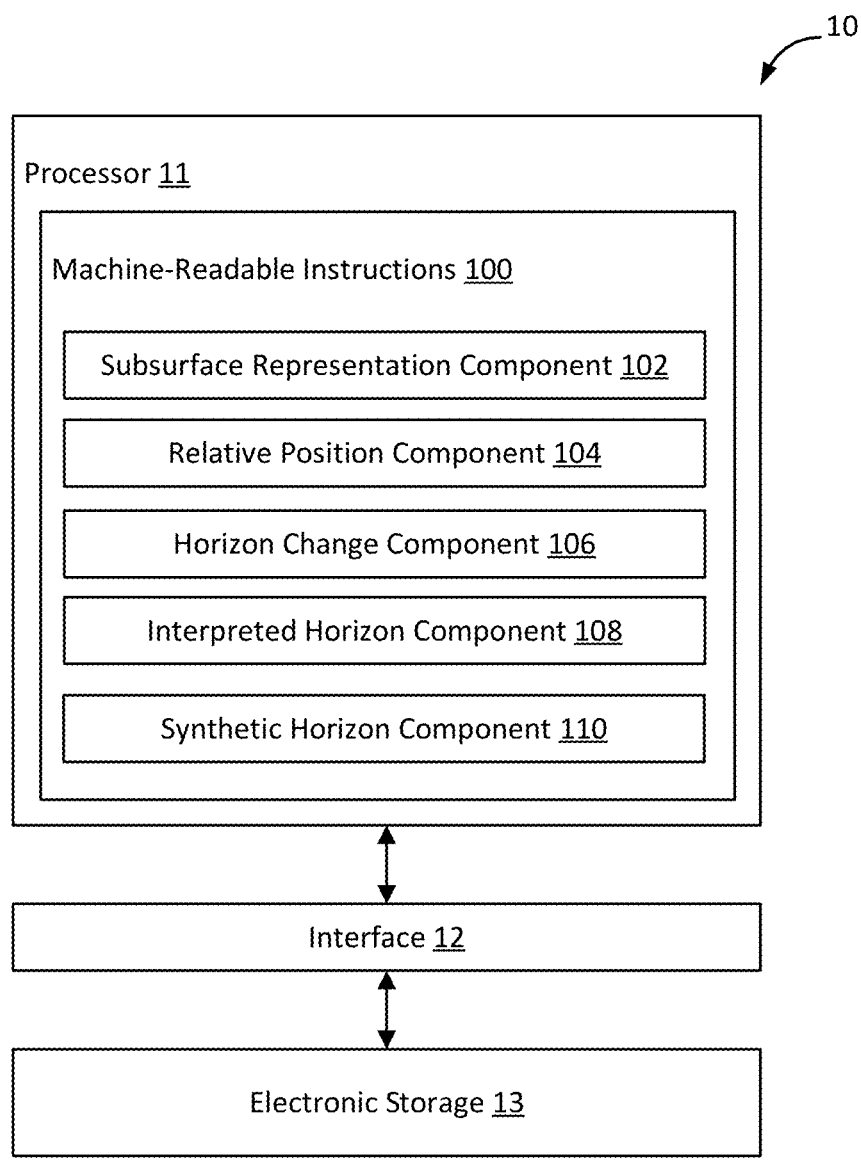
FIG. 1 illustrates an example system that updates horizons in a subsurface representation.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Subsurface representation information, horizon change information, and/or other information may be obtained by the processor 11. The subsurface representation information may define the subsurface representation. The subsurface representation may include interpreted horizons, synthetic horizons, and/or other horizons. At least one of the synthetic horizons may be located between two of the interpreted horizons such that a first synthetic horizon is located between a first interpreted horizon and a second interpreted horizon. Relative positions of individual synthetic horizons with respect to adjacent interpreted horizons may be determined by the processor 11 such that relative positions of the first synthetic horizon are determined with respect to the first interpreted horizon and the second interpreted horizon.

The horizon change information may define change to at least one of the interpreted horizons, such as the first interpreted horizon. The interpreted horizons of the subsurface representation may be updated by the processor 11 based on the horizon change information and/or other information such that the interpreted horizons of the subsurface representation are updated to include change of the first interpreted horizon to a first changed interpreted horizon. The synthetic horizons of the subsurface representation may be updated by the processor 11 based on the update to the interpreted horizons of the subsurface representation and/or other information. The synthetic horizons may be updated to preserve the relative positions of the individual synthetic horizons with respect to the adjacent interpreted horizons such that the synthetic horizons of the subsurface representation are updated to include change of the first synthetic horizon to a first changed synthetic horizon. The relative positions of the first synthetic horizon with respect to the first interpreted horizon and the second interpreted horizon may be preserved in relative positions of the first changed synthetic horizon with respect to the first changed interpreted horizon and the second interpreted horizon.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store subsurface representation information, information relating to subsurface representation, information relating to interpreted horizons, information relating to synthetic horizons, information relating to relative positions of synthetic horizons with respect to adjacent interpreted horizons, horizon change information, information relating to change to interpreted horizons, information relating to update to interpreted horizons, information relating to update to synthetic horizons, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate updating horizons in a subsurface representation. The machine-readable instructions 100 may include one or more computer program components. The machine-readable instructions 100 may include one or more of a subsurface representation component 102, a relative position component 104, a horizon change component 106, an interpreted horizon component 108, a synthetic horizon component 110, and/or other computer program components.

The subsurface representation component 102 may be configured to obtain subsurface representation information and/or other information. Obtaining subsurface representation information may include one or more of accessing, acquiring, analyzing, creating, determining, examining, generating, identifying, loading, locating, opening, receiving, retrieving, reviewing, selecting, storing, utilizing, and/or otherwise obtaining the subsurface representation information. The subsurface representation component 102 may obtain subsurface representation information from one or more locations. For example, the subsurface representation component 102 may obtain subsurface representation information from a storage location, such as the electronic storage 13, electronic storage of a device accessible via a network, and/or other locations. The subsurface representation component 102 may obtain subsurface representation information from one or more hardware components (e.g., a computing device, a component of a computing device) and/or one or more software components (e.g., software running on a computing device). Subsurface representation information may be stored within a single file or multiple files.

The subsurface representation information may define a subsurface representation. The subsurface representation information may define a subsurface representation by including information that describes, delineates, identifies, is associated with, quantifies, reflects, sets forth, and/or otherwise defines one or more of content, quality, attribute, feature, and/or other aspects of the subsurface representation. For example, the subsurface representation information may define a subsurface representation by including information that makes up the content of the subsurface representation and/or information that is used to identify/determine the content of the subsurface representation. Other types of subsurface representation information are contemplated.

A subsurface representation may refer to a computer-generated representation of a subsurface region, such as a one-dimensional, two-dimensional, and/or three-dimensional model of the subsurface region. A subsurface region may refer to a part of earth located beneath the surface/located underground. A subsurface region may refer to a part of earth that is not exposed at the surface of the ground. A subsurface region may be defined in a single dimension (e.g., a point, a line) or in multiple dimensions (e.g., a surface, a volume). For example, a subsurface region may include/be a basin and/or a seismic volume.

A subsurface representation may include geologically plausible arrangement of rock. A subsurface representation may define subsurface configuration at different locations within a subsurface region. Subsurface configuration may refer to attribute, quality, and/or characteristics of a subsurface region. Subsurface configuration may refer to physical arrangement of materials (e.g., subsurface elements) within a subsurface region. Examples of subsurface configuration may include types of subsurface materials, characteristics of subsurface materials, compositions of subsurface materials, arrangements/configurations of subsurface materials, physics of subsurface materials, and/or other subsurface configuration. For instance, subsurface configuration may include and/or define types, shapes, and/or properties of materials and/or layers that form subsurface (e.g., geological, petrophysical, geophysical, stratigraphic) structures.

Figure 3:
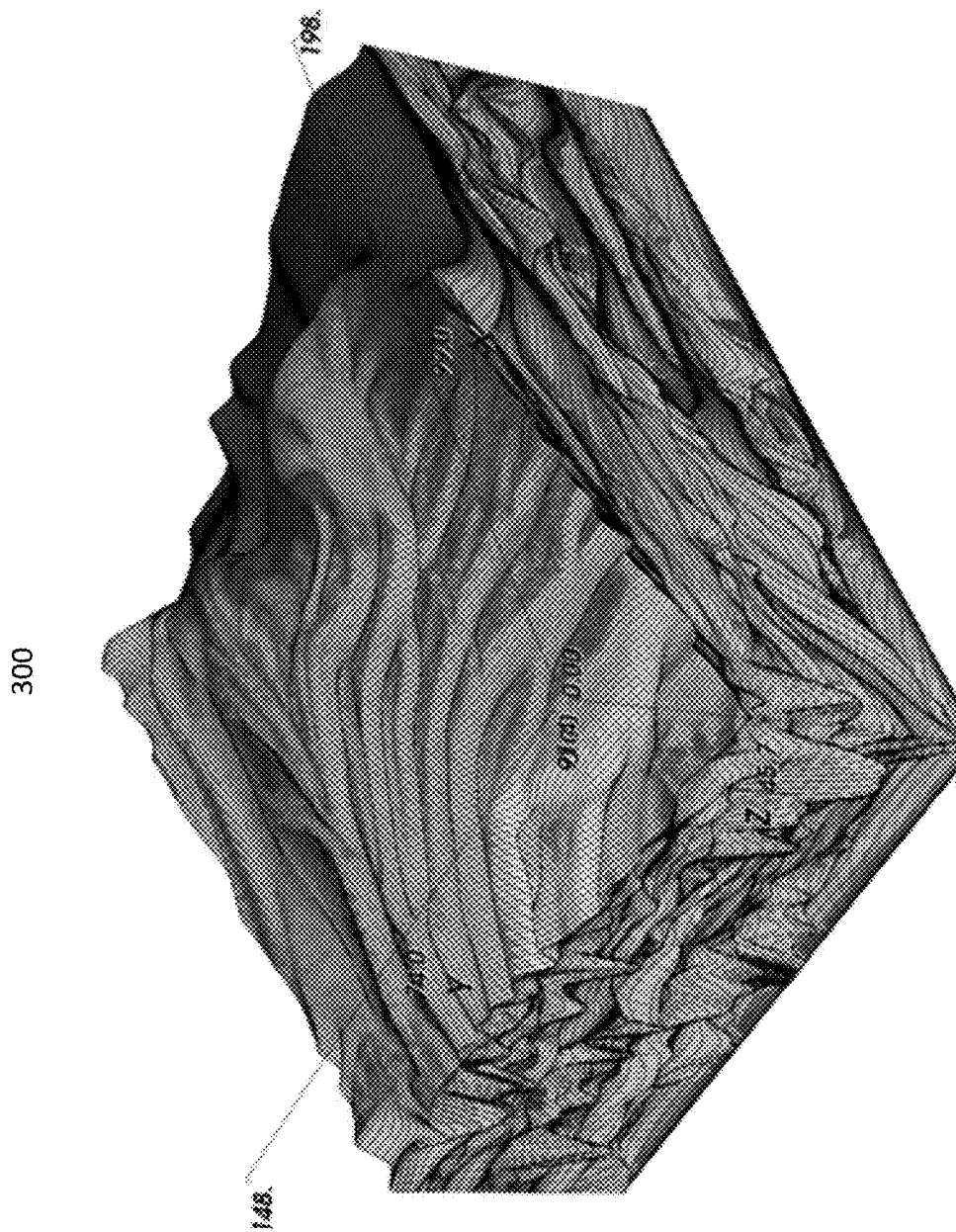
FIG. 3 illustrates an example subsurface representation.

FIG. 3 illustrates an example subsurface representation 300. The subsurface representation 300 may define subsurface configuration of a subsurface region. The subsurface configuration of the subsurface region may be defined within the subsurface representation 300 as a function of spatial location, such as a function of vertical spatial location (e.g., depth), lateral spatial location (e.g., x-y coordinate in map view), and/or other spatial location. The subsurface configuration may be defined within the subsurface representation 300 as a function of temporal location (e.g., time of deposition). For example, the subsurface representation 300 may define different types, shapes, and/or properties of materials and/or layers as a function of depth into the ground and as a function of lateral spatial location. The subsurface configuration defined within the subsurface representation 300 may represent/simulate the subsurface configuration that would be seen within a volume (e.g., basin, reservoir) in the ground.

A subsurface representation may include multiple horizons. A horizon may refer to a structure in the subsurface region that separates subsurface regions/portions of different subsurface configuration. For example, a horizon may refer to a surface where there is a marked change in lithology within a sequence of rocks, and/or a layer/thin bed with a characteristic lithology/content within a sequence. A subsurface representation may include horizons of different types, such as interpreted horizons, synthetic horizons, and/or other horizons.

An interpreted horizon may refer to a horizon that is identified as a horizon using information about the subsurface region. An interpreted horizon may refer to a horizon that is identified as a horizon from seismic interpretations. For example, an interpreted horizon may be identified using seismic reflection data as reflectors and/or seismic events. An interpreted horizon may represent a change in rock properties (e.g., seismic velocity and density) across a boundary between two layers of rock. Other identification/determination of interpreted horizons are contemplated. In some implementations, locations of interpreted horizons may be defined within one or more interpreted depth maps and/or one or more interpreted time maps.

A synthetic horizon may refer to a horizon that is identified as a horizon based on one or more interpreted horizons. A synthetic horizon may refer to a horizon whose location within the subsurface region is determined based on and/or impacted by locations of interpreted horizons within the subsurface region. A synthetic horizon may be located between two interpreted horizons. Other identification/determination of synthetic horizons are contemplated. A synthetic horizon may be included within a subsurface representation to reflect important model components that may not be directly interpreted on seismic data. For example, a synthetic horizon may reflect subintervals of a reservoir, source rock top, source rock base, and/or other horizons that are desired to be included within a modeling of a subsurface region (e.g., basin). In some implementations, locations of synthetic horizons may be defined within one or more synthetic depth maps and/or one or more synthetic time maps. Shape of a synthetic depth/time map may be directly dependent on one or more interpreted depth/time maps.

Dimensions in which horizons are defined may depend on dimensions of the subsurface representations. For example, interpreted horizons and synthetic horizons may be defined as lines within a two-dimensional subsurface representation. Interpreted horizons and synthetic horizons may be defined as surfaces within a three-dimensional subsurface representation.

Figure 4A:
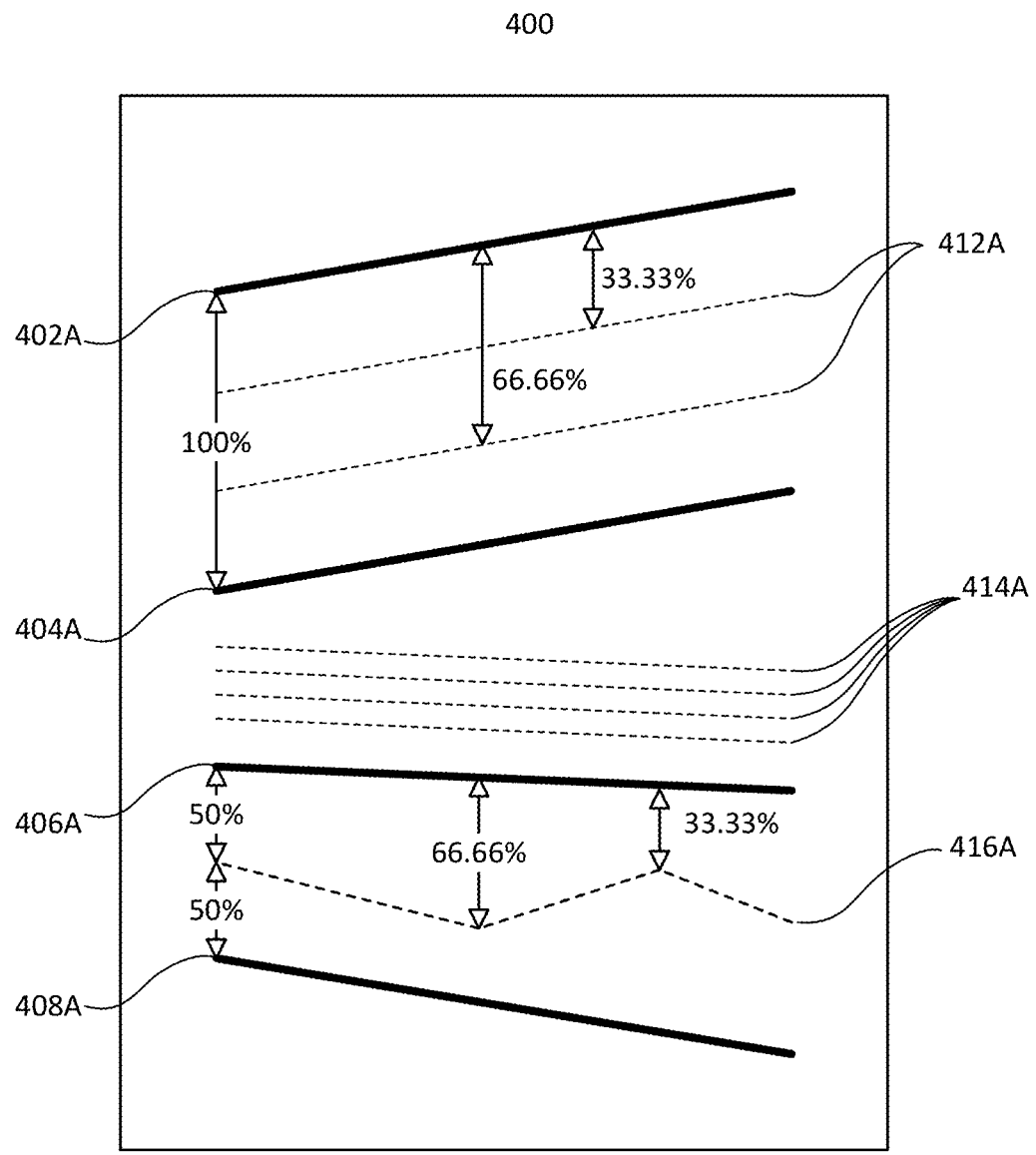
FIG. 4A illustrates example interpreted horizons and synthetic horizons.

FIG. 4A illustrates example subsurface representation 400. The subsurface representation 400 may include interpreted horizons 402A, 404A, 406A, 408A. The subsurface representation 400 may include synthetic horizons 412A, 414A, 416A. The synthetic horizons 412A may be located between the interpreted horizons 402A, 404A. The synthetic horizons 414A may be located between the interpreted horizons 404A, 406A. The synthetic horizon 416A may be located between the interpreted horizons 406A, 408A.

While the subsurface representation 400 is shown in two-dimensions, this is merely as an example and is not meant to be limiting. In some implementations, the subsurface representation 400 may include a two-dimensional representation of a subsurface region. In some implementations, the subsurface representation 400 may include a slice of a three-dimensional representation of a subsurface region.

Modeling of a subsurface region may include changes/updates to horizons within a subsurface representation of the subsurface region. For example, based on new seismic data and/or new interpretation of seismic data, locations of interpreted horizons within a subsurface representation may be changed. Updating the subsurface representation with new locations of horizons (e.g., new seismic derived depth/time maps) may be a manual process that is very time consuming. And once locations of interpreted horizons are updated, locations of synthetics horizons need to be recalculated because synthetic horizons are derived from the interpreted horizons. Rules used to construct the synthetic horizons may be very time-consuming to reimplement. For instance, to determine locations of synthetic horizons within a subsurface representation, it may be necessary to apply formulas that vary across the extent of the subsurface representation/grid. For example, a new velocity model may be applied in modeling the subsurface region, which may invalidate existing synthetic horizons and require recalculation of the synthetic horizons.

The present disclosure enables fast recalculation of synthetic horizon locations based on changes to locations of interpreted horizons. The present disclosure utilizes relative positions of synthetic horizons with respect to adjacent interpreted horizons to update the locations of horizons within a subsurface representation. The locations of synthetic horizons are updated to preserve the relative positions of synthetic horizons with respect to adjacent interpreted horizons. The present disclosure enables faster realizations of subsurface representations, such as for a basin model, and facilitates probabilistic approach of modeling (e.g., probabilistic basin modeling), such as when considering subsurface geometry as an uncertainty factor.

The relative position component 104 may be configured to determine relative positions of individual synthetic horizons with respect to adjacent interpreted horizons. Relative positions of individual synthetic horizons with respect to adjacent interpreted horizons may refer to relative spatial positions and/or relative temporal positions of the individual synthetic horizons with respect to the adjacent interpreted horizons. That is, the relative positions of individual synthetic horizons with respect to adjacent interpreted horizons may be determined in the spatial domain and/or in the time domain.

For example, relative position of a synthetic horizon with respect to adjacent interpreted horizons may refer to vertical/depth location of a synthetic horizon relative to the nearest interpreted horizon above and below the synthetic horizon. Relative position of a synthetic horizon with respect to adjacent interpreted horizons may refer to relative vertical distances (e.g., ratios, fractions) by which the synthetic horizon is separated from the nearest interpreted horizon above and below the synthetic horizon. As another example, relative position of a synthetic horizon with respect to adjacent interpreted horizons may refer to time of a synthetic horizon relative to the nearest interpreted horizon above and below the synthetic horizon. Relative position of a synthetic horizon with respect to adjacent interpreted horizons may refer to relative temporal distances (e.g., ratios, fractions) by which the synthetic horizon is separated from the nearest interpreted horizon above and below the synthetic horizon.

For example, referring to FIG. 4A, the relative positions of the synthetic horizons 412A with respect to adjacent interpreted horizons 402A, 404A may be determined, the relative positions of the synthetic horizons 414A with respect to adjacent interpreted horizons 404A, 406A may be determined, and the relative positions of the synthetic horizon 416A with respect to adjacent interpreted horizons 406A, 408A may be determined.

In some implementations, relative position of a synthetic horizon with respect to adjacent interpreted horizons may vary as a function of lateral spatial location (e.g., x-y coordinate in map view). The relative positions of the individual synthetic horizons with respect to the adjacent interpreted horizons may be determined at grid points of the subsurface representation across the individual synthetic horizons. For example, the subsurface representation may include a synthetic horizon whose relative distance to adjacent interpreted horizons varies laterally across the subsurface representation, and the relative positions of the synthetic horizon with respect to the adjacent interpreted horizons may be determined for different points of the synthetic horizon laterally across the subsurface representation.

In some implementations, the relative positions of the individual synthetic horizons with respect to the adjacent interpreted horizons may be determined as distance ratios of the individual synthetic horizons between the adjacent interpreted horizons. Distance ratios of synthetic horizons may refer to the ratio of distance (fractional distances) by which synthetic horizons are separated between adjacent interpreted horizons. Distance ratios of synthetic horizons may include spatial distance ratios and/or temporal distance ratios. Distance ratios of synthetic horizons may describe the spatial and/or temporal positions of synthetic horizons between adjacent interpreted horizons.

For instance, referring to FIG. 4A, distance ratios of individual synthetic horizons with respect to adjacent interpreted horizons are shown as percentages, with distances between interpreted horizons being expressed as 100%. For example, the relative positions of the synthetic horizons 412A with respect to the adjacent interpreted horizons 402A, 404A may be determined as distance ratios 33.33% and 66.66% of the synthetic horizons 412A between the adjacent interpreted horizons 402A, 404A. As another example, the relative positions of the synthetic horizon 416A with respect to the adjacent interpreted horizons 406A, 408A may be determined as distance ratios at different locations across the subsurface representation 400 (e.g., 1:1 at left most point; 2:1 towards middle; 1:2 towards middle-right).

The horizon change component 106 may be configured to obtain horizon change information and/or other information. The horizon change information may define change to at least one of the interpreted horizons within the subsurface representation. That is, the horizon change information may define change to one or more of the interpreted horizons within the subsurface representation. Change to an interpreted horizon may include change to location (e.g., geometry), age, and/or other characteristics of the interpreted horizon. In some implementations, the horizon change information may be determined from and/or reflect changes to the modeling of the subsurface region. For example, the horizon change information may be determined from and/or reflect changes to velocity model for the subsurface region, changes to depth-time relationships, changes to understanding of the modeling framework (e.g., derived from new understanding of basin framework and/or age of settlement in the basin), addition of new seismic/well data which leads to new interpretation of horizons, and/or other information.

In some implementations, change of an interpreted horizon to a changed interpreted horizon may include the interpreted horizon being shifted vertically and/or laterally within the subsurface representation to generate the changed interpreted horizon. That is, the placement of the interpreted horizon within the subsurface representation may be changed by moving the interpreted horizon laterally (e.g., left, right, forward, backward) and/or vertically (e.g., up, down) within the subsurface representation and/or rotating the interpreted horizon about a vertical axis. Such movement may change the relative positions (e.g., vertical/depth/time location) of adjacent synthetic horizon to the interpreted horizon.

In some implementations, change of an interpreted horizon to a changed interpreted horizon may include a shape of the interpreted horizon being changed to generate the changed interpreted horizon. Shape of the interpreted horizon across one or more portions of the interpreted horizon or across the entirety of the interpreted horizon may be changed. For example, a straight portion of the interpreted horizon may be changed in shape to include a non-straight portion (e.g., curve, jagged line, corner, wave), or vice versa.

In some implementations, change of an interpreted horizon to the changed interpreted horizon may include a slope of the interpreted horizon being changed to generate the changed interpreted horizon. Slope of the interpreted horizon may be increased and/or decreased across one or more portions of the interpreted horizon or across the entirety of the interpreted horizon.

The interpreted horizon component 108 may be configured to update the interpreted horizons of the subsurface representation based on the horizon change information and/or other information. Updating the interpreted horizons of the subsurface representation may include changing the locations of the interpreted horizons in the subsurface representation in accordance with the change defined by the horizon change information. For example, the interpreted horizon component 108 may update the interpreted horizons of the subsurface representation based on the horizon change information to change one or more of vertical location, lateral location, shape, and/or slope of one or more interpreted horizons. The interpreted horizons of the subsurface representation may be updated to include change of an interpreted horizon to a changed interpreted horizon.

Figure 4B:
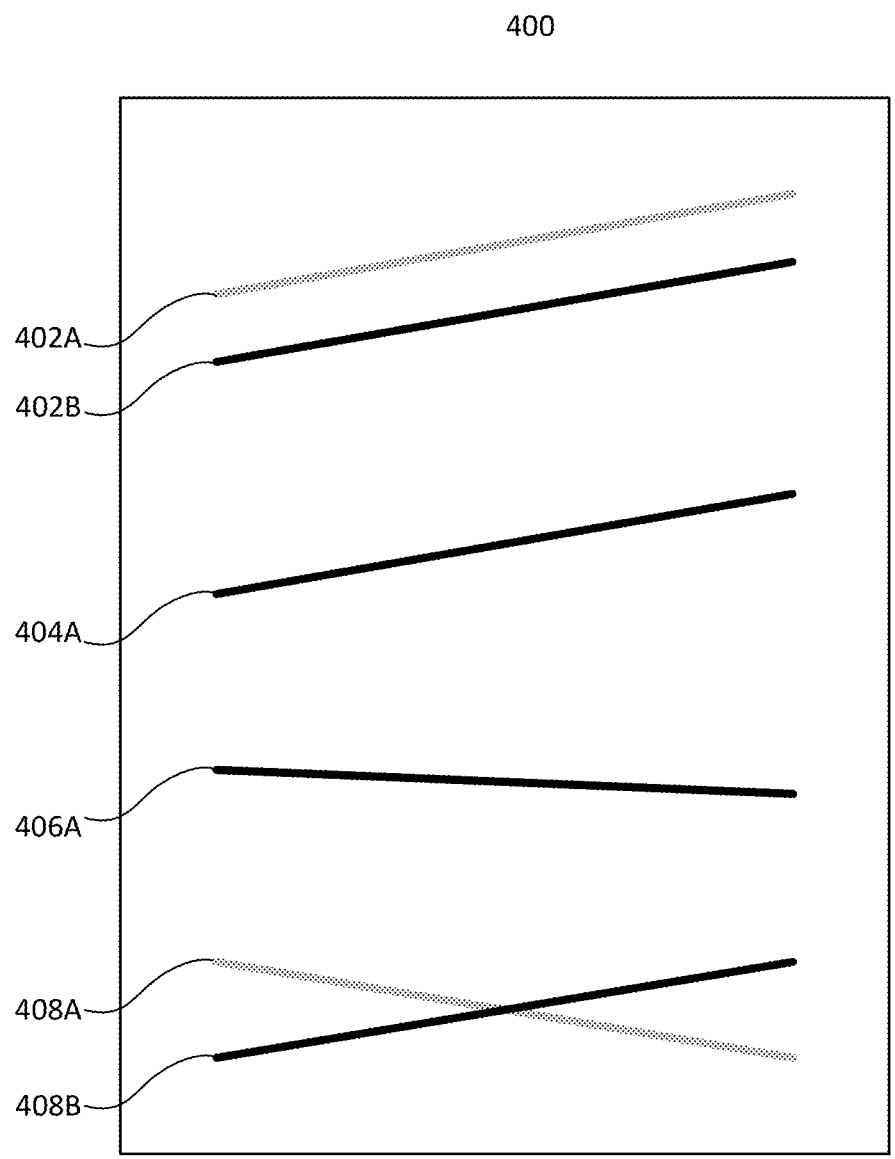
FIG. 4B illustrates example changes to interpreted horizons shown in FIG. 4A.

FIG. 4B illustrates example changes to interpreted horizons shown in FIG. 4A. In FIG. 4B, the horizon 402A may be shifted down vertically to become a horizon 402B in the subsurface representation 400. The slope of the horizon 408A may be changed to become a horizon 408B in the subsurface representation 400. The interpreted horizons 404A, 406A may remain unchanged in the subsurface representation 400. Other changes to interpreted horizons are contemplated.

The synthetic horizon component 110 may be configured to update the synthetic horizons of the subsurface representation based on the update to the interpreted horizons of the subsurface representation and/or other information. Updating the synthetic horizons of the subsurface representation may include changing the locations of the synthetic horizons in the subsurface representation based on the changes to the interpreted horizons of the subsurface representation. Changing the locations of the synthetic horizons in the subsurface representation may include changing one or more of vertical location, lateral location, shape, slope, and/or other characteristics of the synthetic horizon relating to the locations of the synthetic horizons. A change to an interpreted horizon may impact the locations of adjacent synthetic horizons. Adjacent synthetic horizons may refer to synthetic horizons bounded by the interpreted horizon and another interpreted horizon. A change to an interpreted horizon may impact (1) the locations of synthetic horizons between the changed interpreted horizon and an interpreted horizon immediately above the changed interpreted horizon, and (2) the locations of synthetic horizons between the changed interpreted horizon and an interpreted horizon immediately below the changed interpreted horizon. That is, locations of synthetic horizons may be affected by change in location of one or both interpreted horizons that bounds the synthetic horizons.

The synthetic horizons of the subsurface representation may be updated without using rule(s)/formula(s) that were used to originally generate the synthetic horizons. Instead, the synthetic horizons may be updated to preserve the relative positions of the individual synthetic horizons with respect to the adjacent interpreted horizons. The synthetic horizons of the subsurface representation may be updated to include change of a synthetic horizon to a changed synthetic horizon based on one of both of the adjacent interpreted horizons having been changed within the subsurface representation. For example, a synthetic horizon may be located between an above-interpreted horizon and a below-interpreted horizon, with the above-interpreted horizon having been changed within the subsurface representation to a changed above-interpreted horizon. The synthetic horizon may be updated to a changed synthetic horizon, with the relative positions of the synthetic horizon with respect to the above-interpreted horizon and the below-interpreted horizon preserved in relative positions of the changed synthetic horizon with respect to the changed above-interpreted horizon and the below-interpreted horizon.

In some implementations, preserving the relative positions of synthetic horizons with respect to adjacent interpreted horizons may include preserving distance ratios (e.g., spatial distance ratios, temporal distance ratios) of synthetic horizons between the adjacent interpreted horizons. That is, the locations of synthetic horizons between two interpreted horizons may be updated based on changes to one or both of the interpreted horizons so that distance ratios of the synthetic horizons to the interpreted horizons are preserved in the updated subsurface representation. The changed synthetic horizons may maintain ratio of distance between the nearest interpreted horizon above and below the synthetic horizons.

Figure 4C:
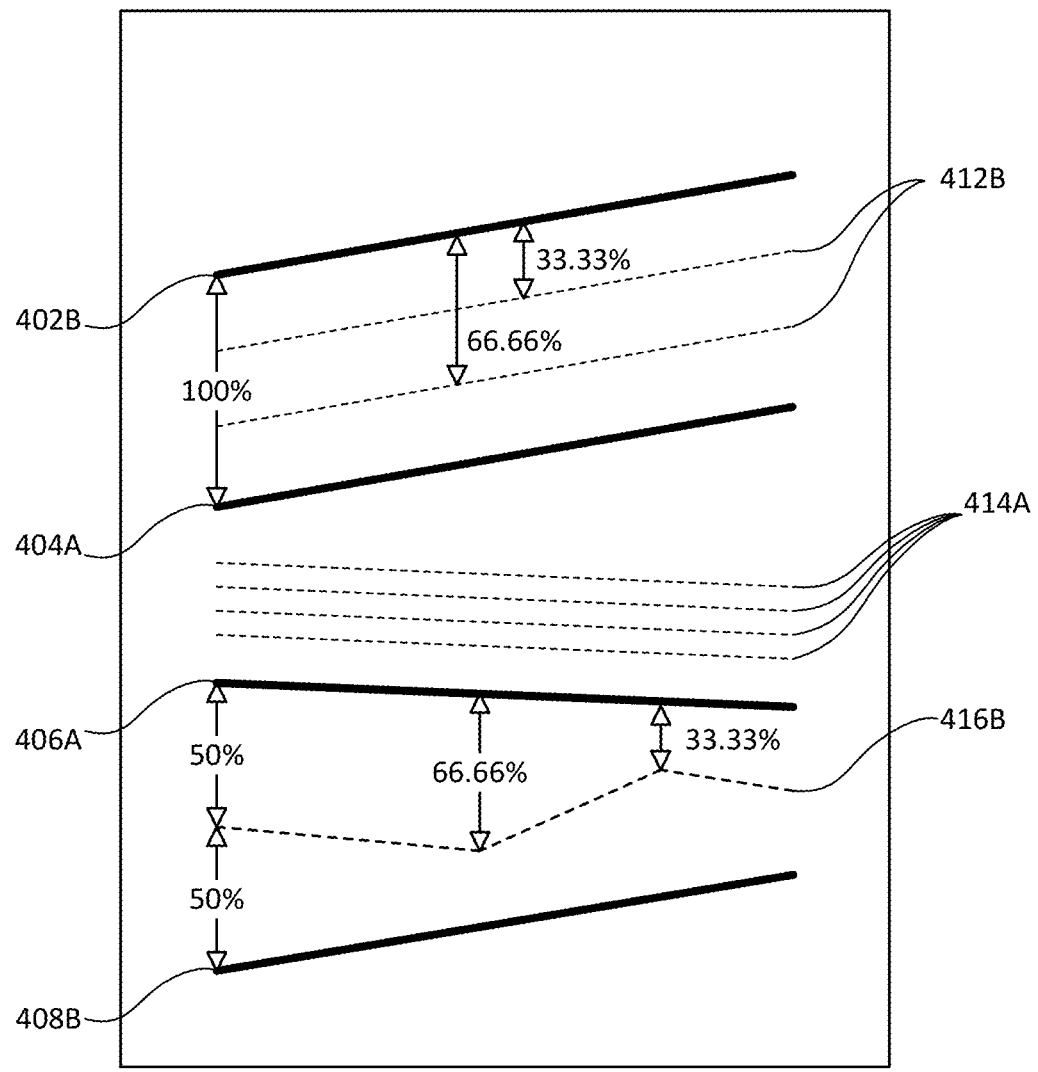
FIG. 4C illustrates example changes to synthetic horizons based on changes to the interpreted horizons shown in FIG. 4B.

FIG. 4C illustrates example changes to synthetic horizons based on changes to the interpreted horizons shown in FIG. 4B. As shown in FIG. 4C, the distance between interpreted horizons 402B (changed from interpreted horizon 402A), 404A are expressed as 100%, and the distance between interpreted horizons 406A, 408B (changed from interpreted horizon 408A) are expressed as 100%. The synthetic horizons 412B in FIG. 4C are moved closer together (compared to the synthetic horizons 412A) to preserve the distance ratios 33.33% and 66.66% of the synthetic horizons 412B between the adjacent interpreted horizons 402B, 404A. The locations of synthetic horizons 414A remains unchanged in FIG. 4C because locations of the interpreted horizons 404A, 406A have not changed. The location of synthetic horizon 416B has changed (from the synthetic horizon 416A) in FIG. 4C to preserve the distance ratios to the adjacent interpreted horizons 406A, 408B at different locations across the subsurface representation 400. Thus, the distance ratios of synthetic horizons between adjacent interpreted horizons in the original subsurface representation are applied to update the subsurface representation to rederive the locations of synthetic horizons.

In some implementations, the update to the synthetic horizons may include change to ages of the synthetic horizons. For example, age of one or both interpreted horizons that bound a synthetic horizon may be changed. The change in age(s) of the interpreted horizons may be propagated to the bounded synthetic horizons. For example, linear interpolation may be used to determine the ages of synthetic horizons bounded by two interpreted horizons. The ages of the synthetic horizons may be recalculated based on change to age(s) of the interpreted horizon(s).

Figure 5:
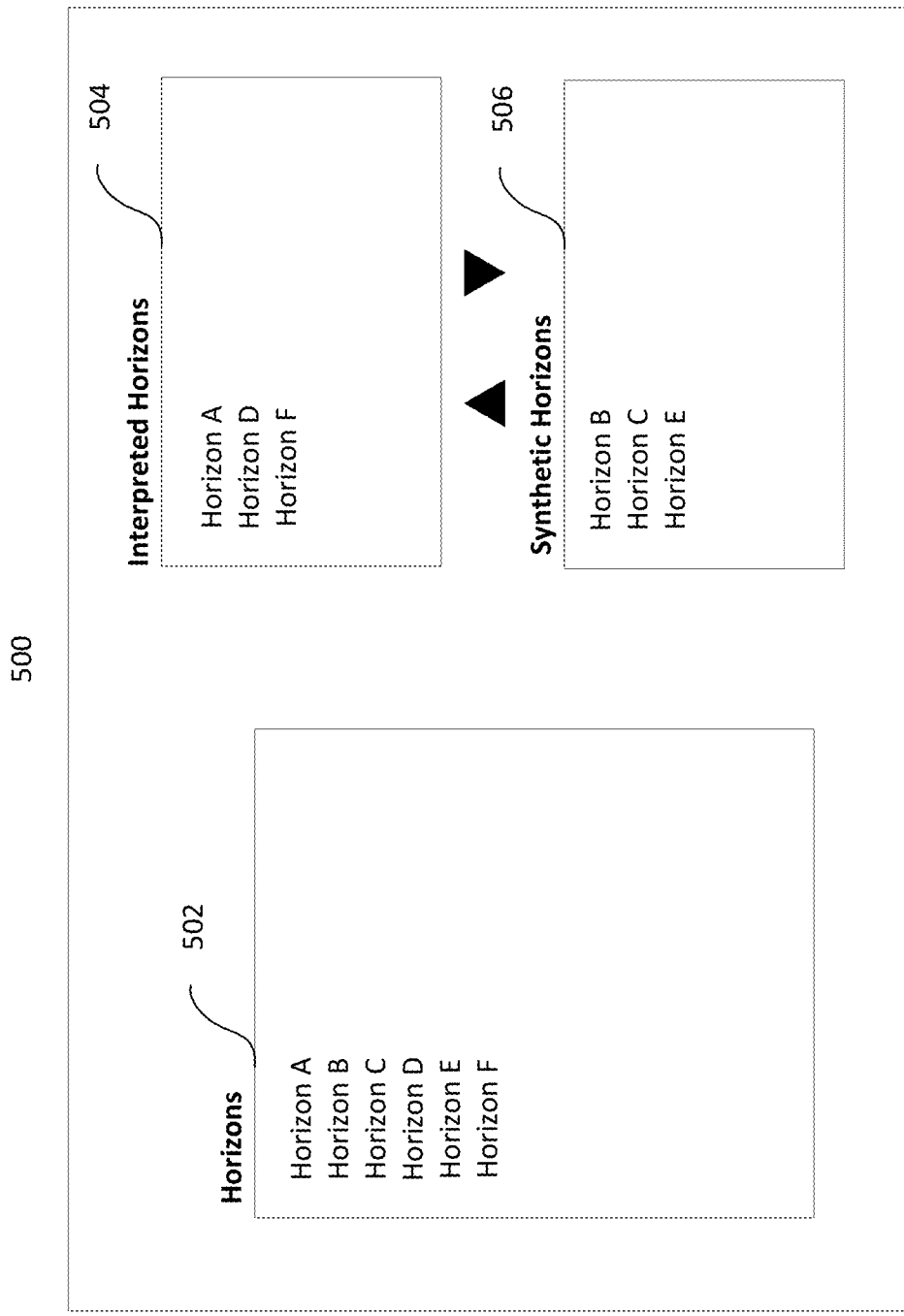
FIG. 5 illustrates an example user interface for classifying horizons as interpreted horizons or synthetic horizons.

FIG. 5 illustrates an example user interface 500 for classifying horizons as interpreted horizons or synthetic horizons. The user interface 500 may include a horizons panel 502, an interpreted horizons panel 504, and a synthetic horizons panel 506. The horizons panel 502 may include a full or partial listing of horizons included in a subsurface representation. The horizons panel 502 may include a listing of horizons defined by interpreted depth/time maps, synthetic depth/time maps, and/or other depth/time maps. The horizons may be classified as interpreted horizons or synthetic horizons. Horizons classified as interpreted horizons may be listed in the interpreted horizons panel 504. Horizons classified as synthetic horizons may be listed in the synthetic horizons panel 506.

In some implementations, the listing of horizons in one or more of the panels 502, 504, 506 may be sorted based on depth/time of the horizons. For example, horizons in the panels 502, 504, 506 may be listed in order of increasing average depth/time.

In some implementations, one of more of the horizons may be classified automatically. For example, the top-most (e.g., shallowest) horizon and/or the bottom most (e.g., deepest) horizon may be automatically classified as interpreted horizon(s). As another example, the horizons may be classified automatically as interpreted horizons or synthetic horizons based on metadata associated with the horizons (e.g., name of the depth/time maps). For instance, horizons defined by depth/time maps with the term "interp" in the name may be automatically classified as interpreted horizons and horizons defined by depth/time maps without the term "interp" in the name may be automatically classified as synthetic horizons. Other automatic classifications of horizons are contemplated.

In some implementations, one of more of the horizons may be classified manually. For example, a user may classify a horizon as an interpreted horizon or a synthetic horizon by moving the horizon from the horizons panel 502 to the interpreted horizons panel 504 or the synthetic horizons panel 506.

A user may change classification of a horizon. For example, a user may select a horizon listed in the interpreted horizons panel 504 and click on the down arrow to classify the horizon as a synthetic horizon. A user may select a horizon listed in the synthetic horizons panel 506 and click on the up arrow to classify the horizon as an interpreted horizon.

Figure 6:
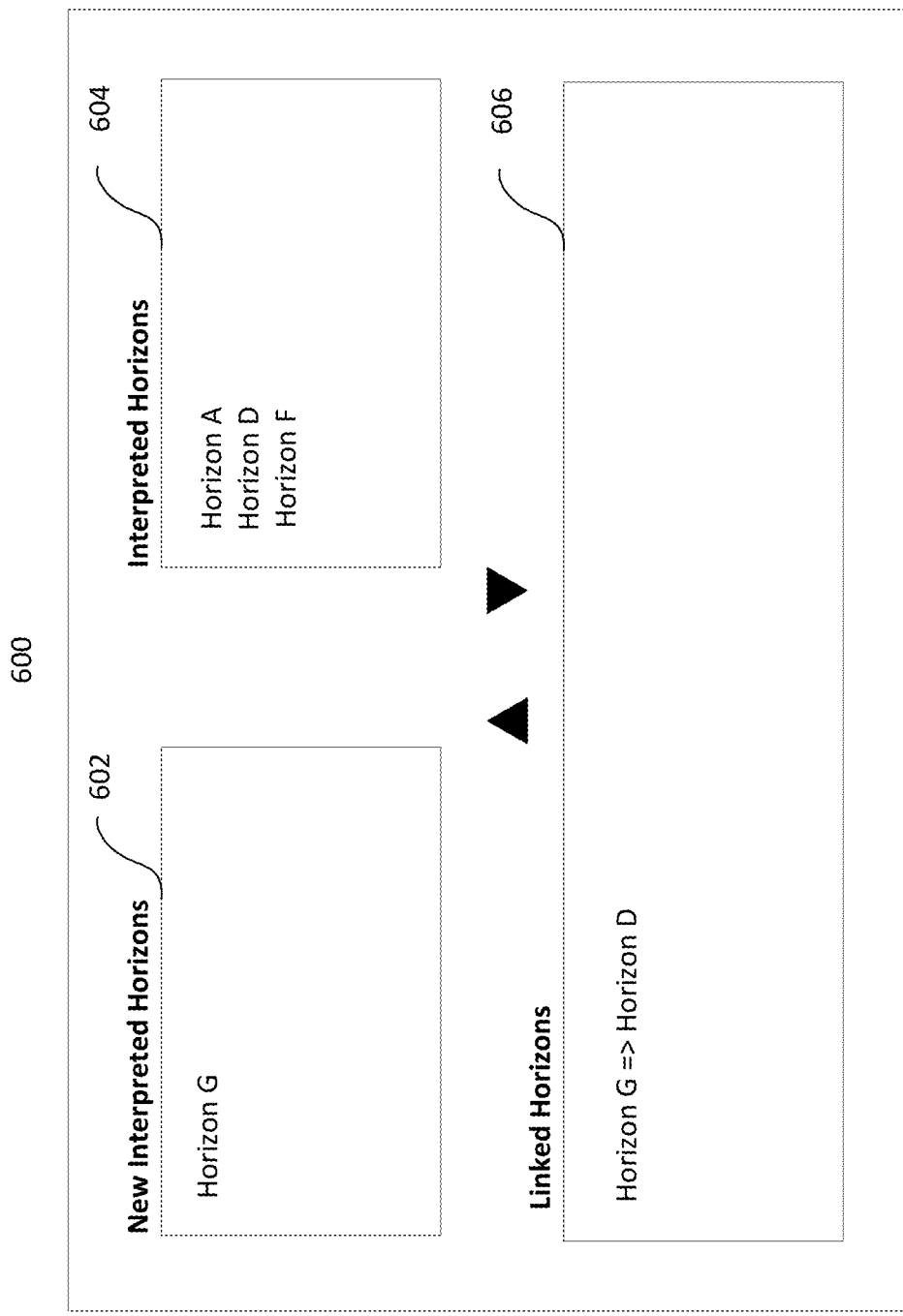
FIG. 6 illustrates an example user interface for changing interpreted horizons.

FIG. 6 illustrates an example user interface 600 for changing interpreted horizons. The user interface 600 may include a new interpreted horizons panel 602, an interpreted horizons panel 604, and a linked horizons panel 606. The new interpreted horizons panel 602 may include a listing of new (changed) interpreted horizons in a subsurface representation. The interpreted horizons panel 604 may include a listing of interpreted horizons included in an existing subsurface representation. The linked horizons panel 606 may include a listing of interpreted horizons that are to be changed in the updated subsurface representation. Linking of a new interpreted horizon to an existing interpreted horizon may result in the existing interpreted horizon being replaced by the new interpreted horizon in the updated subsurface representation.

For example, as shown in FIG. 6, Horizon G (new interpreted horizon) may be linked with Horizon D (existing interpreted horizon) to change Horizon D to Horizon G in the updated subsurface representation. A user may link a new interpreted horizon to an existing interpreted horizon by selecting the new interpreted horizon in the new interpreted horizons panel 602, selecting the corresponding existing interpreted horizon in the interpreted horizons panel 604, and clicking on the down arrow. A user may delink a new interpreted horizon and the corresponding existing interpreted horizon by selecting the linkage in the linked horizons panel 606 and clicking on the up arrow. Other user interfaces are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
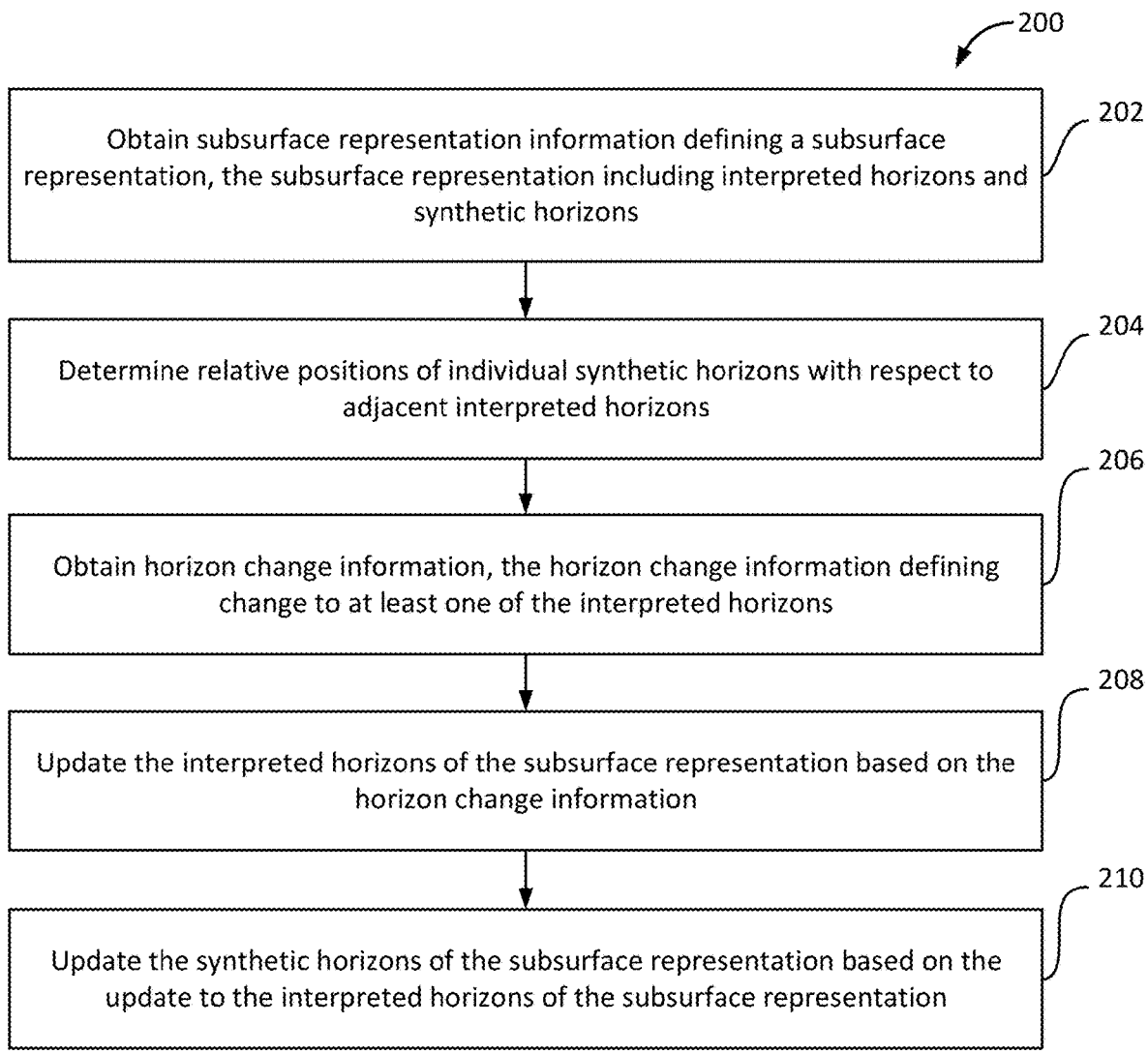
FIG. 2 illustrates an example method for updating horizons in a subsurface representation.

FIG. 2 illustrates method 200 for updating horizons in a subsurface representation. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, subsurface representation information may be obtained. The subsurface representation information may define a subsurface representation. The subsurface representation may include interpreted horizons, synthetic horizons, and/or other horizons. At least one of the synthetic horizons may be located between two of the interpreted horizons such that a first synthetic horizon is located between a first interpreted horizon and a second interpreted horizon. In some implementation, operation 202 may be performed by a processor component the same as or similar to the subsurface representation component 102 (Shown in FIG. 1 and described herein).

At operation 204, relative positions of individual synthetic horizons with respect to adjacent interpreted horizons may be determined such that relative positions of the first synthetic horizon are determined with respect to the first interpreted horizon and the second interpreted horizon. In some implementation, operation 204 may be performed by a processor component the same as or similar to the relative position component 104 (Shown in FIG. 1 and described herein).

At operation 206, horizon change information may be obtained. The horizon change information may define change to at least one of the interpreted horizons, such as the first interpreted horizon. In some implementation, operation 206 may be performed by a processor component the same as or similar to the horizon change component 106 (Shown in FIG. 1 and described herein).

At operation 208, the interpreted horizons of the subsurface representation may be updated based on the horizon change information such that the interpreted horizons of the subsurface representation are updated to include change of the first interpreted horizon to a first changed interpreted horizon. In some implementation, operation 208 may be performed by a processor component the same as or similar to the interpreted horizon component 108 (Shown in FIG. 1 and described herein).

At operation 210, the synthetic horizons of the subsurface representation may be updated based on the update to the interpreted horizons of the subsurface representation. The synthetic horizons may be updated to preserve the relative positions of the individual synthetic horizons with respect to the adjacent interpreted horizons such that the synthetic horizons of the subsurface representation are updated to include change of the first synthetic horizon to a first changed synthetic horizon. The relative positions of the first synthetic horizon with respect to the first interpreted horizon and the second interpreted horizon may be preserved in relative positions of the first changed synthetic horizon with respect to the first changed interpreted horizon and the second interpreted horizon. In some implementation, operation 210 may be performed by a processor component the same as or similar to the synthetic horizon component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for updating horizons in a subsurface representation, the system comprising:
   one or more physical processors configured by machine-readable instructions to:
   obtain subsurface representation information defining the subsurface representation, the subsurface representation including interpreted horizons that are identified based on interpretation of seismic data and synthetic horizons that are identified based on one or more of the interpreted horizons to reflect subsurface components that are not interpreted on the seismic data, wherein at least one of the synthetic horizons are located between two of the interpreted horizons such that a first synthetic horizon is located between a first interpreted horizon and a second interpreted horizon;
   determine relative positions of individual synthetic horizons with respect to adjacent interpreted horizons such that relative positions of the first synthetic horizon are determined with respect to the first interpreted horizon and the second interpreted horizon, wherein the relative positions of the individual synthetic horizons with respect to the adjacent interpreted horizons are determined as distance ratios of the individual synthetic horizons between the adjacent interpreted horizons, wherein the distance ratio of the first synthetic horizon between the first interpreted horizon and the second interpreted horizon includes a first ratio of distance by which the first synthetic horizon is separated between the first interpreted horizon and the second interpreted horizon;
   obtain horizon change information, the horizon change information defining change to at least one of the interpreted horizons, the at least one of the interpreted horizons including the first interpreted horizon;
   modify the subsurface representation to update the interpreted horizons based on the horizon change information such that the interpreted horizons of the subsurface representation are updated to include change of the first interpreted horizon to a first changed interpreted horizon; and
   modify the subsurface representation to update the synthetic horizons based on the update to the interpreted horizons of the subsurface representation, wherein the synthetic horizons are updated to preserve the relative positions of the individual synthetic horizons with respect to the adjacent interpreted horizons such that the synthetic horizons of the subsurface representation are updated to include change of the first synthetic horizon to a first changed synthetic horizon, the relative positions of the first synthetic horizon with respect to the first interpreted horizon and the second interpreted horizon preserved in relative positions of the first changed synthetic horizon with respect to the first changed interpreted horizon and the second interpreted horizon, wherein a second ratio of distance by which the first changed synthetic horizon is separated between the first changed interpreted horizon and the second interpreted horizon is same as the first ratio of distance by which the first synthetic horizon is separated between the first interpreted horizon and the second interpreted horizon.

2. The system of claim 1, wherein the first interpreted horizon is located above the second interpreted horizon, a third interpreted horizon is located above the first interpreted horizon, and change of the first interpreted horizon to the first changed interpreted horizon affects locations of synthetic horizons between the first changed interpreted horizon and the second interpreted horizon and locations of synthetic horizons between the first changed interpreted horizon and the third interpreted horizon.

3. The system of claim 1, wherein the subsurface representation includes a two-dimensional subsurface representation, and the interpreted horizons and the synthetic horizons are defined as lines within the two-dimensional subsurface representation.

4. The system of claim 1, wherein the subsurface representation includes a three-dimensional subsurface representation, and the interpreted horizons and the synthetic horizons are defined as surfaces within the three-dimensional subsurface representation.

5. The system of claim 1, wherein the change of the first interpreted horizon to the first changed interpreted horizon includes the first interpreted horizon being shifted vertically or laterally within the subsurface representation to generate the first changed interpreted horizon.

6. The system of claim 1, wherein the change of the first interpreted horizon to the first changed interpreted horizon includes a slope of the first interpreted horizon being changed to generate the first changed interpreted horizon.

7. The system of claim 1, wherein the change of the first interpreted horizon to the first changed interpreted horizon includes a shape of the first interpreted horizon being changed to generate the first changed interpreted horizon.

8. The system of claim 1, wherein the relative positions of the individual synthetic horizons with respect to the adjacent interpreted horizons are determined at grid points across the individual synthetic horizons.

9. The system of claim 1, wherein the update to the synthetic horizons includes change to ages of the synthetic horizons.

10. A method for updating horizons in a subsurface representation, the method comprising:
obtaining subsurface representation information defining the subsurface representation, the subsurface representation including interpreted horizons that are identified based on interpretation of seismic data and synthetic horizons that are identified based on one or more of the interpreted horizons to reflect subsurface components that are not interpreted on the seismic data, wherein at least one of the synthetic horizons are located between two of the interpreted horizons such that a first synthetic horizon is located between a first interpreted horizon and a second interpreted horizon;
determining relative positions of individual synthetic horizons with respect to adjacent interpreted horizons such that relative positions of the first synthetic horizon are determined with respect to the first interpreted horizon and the second interpreted horizon, wherein the relative positions of the individual synthetic horizons with respect to the adjacent interpreted horizons are determined as distance ratios of the individual synthetic horizons between the adjacent interpreted horizons, wherein the distance ratio of the first synthetic horizon between the first interpreted horizon and the second interpreted horizon includes a first ratio of distance by which the first synthetic horizon is separated between the first interpreted horizon and the second interpreted horizon;
obtaining horizon change information, the horizon change information defining change to at least one of the interpreted horizons, the at least one of the interpreted horizons including the first interpreted horizon;
modifying the subsurface representation to update the interpreted horizons based on the horizon change information such that the interpreted horizons of the subsurface representation are updated to include change of the first interpreted horizon to a first changed interpreted horizon; and
modifying the subsurface representation to update the synthetic horizons based on the update to the interpreted horizons of the subsurface representation, wherein the synthetic horizons are updated to preserve the relative positions of the individual synthetic horizons with respect to the adjacent interpreted horizons such that the synthetic horizons of the subsurface representation are updated to include change of the first synthetic horizon to a first changed synthetic horizon, the relative positions of the first synthetic horizon with respect to the first interpreted horizon and the second interpreted horizon preserved in relative positions of the first changed synthetic horizon with respect to the first changed interpreted horizon and the second interpreted horizon, wherein a second ratio of distance by which the first changed synthetic horizon is separated between the first changed interpreted horizon and the second interpreted horizon is same as the first ratio of distance by which the first synthetic horizon is separated between the first interpreted horizon and the second interpreted horizon.

11. The method of claim 10, wherein the first interpreted horizon is located above the second interpreted horizon, a third interpreted horizon is located above the first interpreted horizon, and change of the first interpreted horizon to the first changed interpreted horizon affects locations of synthetic horizons between the first changed interpreted horizon and the second interpreted horizon and locations of synthetic horizons between the first changed interpreted horizon and the third interpreted horizon.

12. The method of claim 10, wherein the subsurface representation includes a two-dimensional subsurface representation, and the interpreted horizons and the synthetic horizons are defined as lines within the two-dimensional subsurface representation.

13. The method of claim 10, wherein the subsurface representation includes a three-dimensional subsurface representation, and the interpreted horizons and the synthetic horizons are defined as surfaces within the three-dimensional subsurface representation.

14. The method of claim 10, wherein the change of the first interpreted horizon to the first changed interpreted horizon includes the first interpreted horizon being shifted vertically or laterally within the subsurface representation to generate the first changed interpreted horizon.

15. The method of claim 10, wherein the change of the first interpreted horizon to the first changed interpreted horizon includes a slope of the first interpreted horizon being changed to generate the first changed interpreted horizon.

16. The method of claim 10, wherein the change of the first interpreted horizon to the first changed interpreted horizon includes a shape of the first interpreted horizon being changed to generate the first changed interpreted horizon.

17. The method of claim 10, wherein the relative positions of the individual synthetic horizons with respect to the adjacent interpreted horizons are determined at grid points across the individual synthetic horizons.

18. The method of claim 10, wherein the update to the synthetic horizons includes change to ages of the synthetic horizons.

* * * * *